(12) United States Patent
Taylor et al.

(10) Patent No.: US 11,303,143 B2
(45) Date of Patent: Apr. 12, 2022

(54) WIRELESS CHARGING MOUNT FOR HANDHELD ELECTRONIC DEVICES

(71) Applicant: ANNEX PRODUCTS PTY. LTD., Prahran (AU)

(72) Inventors: Benjamin M. Taylor, Malvern East (AU); Craig Stevens, Northcote (AU); Christopher L. Peters, Glen Iris (AU)

(73) Assignee: ANNEX PRODUCTS PTY LTD, South Yarra (AU)

( * ) Notice: Subject to any disclaimer, the term of this patent is extended or adjusted under 35 U.S.C. 154(b) by 0 days.

(21) Appl. No.: 16/788,572

(22) Filed: Feb. 12, 2020

(65) Prior Publication Data
US 2021/0249880 A1   Aug. 12, 2021

(51) Int. Cl.
*H01M 10/46* (2006.01)
*H02J 7/00* (2006.01)
*H02J 7/02* (2016.01)

(52) U.S. Cl.
CPC ............. *H02J 7/0044* (2013.01); *H02J 7/02* (2013.01)

(58) Field of Classification Search
CPC ...... H02J 7/0044; H02J 7/0045; H02J 7/0042; H02J 7/02; H02J 50/10; H02J 50/005
USPC ........ 320/107, 108, 109, 114, 115; D13/107, D13/108
See application file for complete search history.

(56) References Cited

U.S. PATENT DOCUMENTS

| | | | |
|---|---|---|---|
| 6,756,697 B2 | 6/2004 | Mizutani et al. | |
| 6,765,362 B2 | 7/2004 | Ta | |
| 7,180,265 B2 | 2/2007 | Naskali et al. | |
| 7,411,307 B2 | 8/2008 | Uno | |
| 7,868,585 B2 | 1/2011 | Sarnowsky et al. | |
| 9,243,739 B2 | 1/2016 | Peters | |
| 9,300,151 B2 | 3/2016 | Chen et al. | |
| 9,319,086 B2 | 4/2016 | Wong et al. | |
| 9,573,533 B2 | 2/2017 | Lachnitt | |
| 9,772,066 B2 | 9/2017 | Tseng | |
| 10,110,043 B2 | 10/2018 | Moon | |
| 10,291,059 B2 | 5/2019 | Davison et al. | |
| 10,389,160 B2 | 8/2019 | Miller et al. | |
| 2007/0135174 A1 | 6/2007 | Musk et al. | |
| 2011/0050164 A1 | 3/2011 | Partovi et al. | |
| 2011/0077809 A1* | 3/2011 | Leary | B60L 11/1818 701/22 |
| 2011/0291614 A1 | 12/2011 | Yeh | |
| 2012/0013294 A1 | 1/2012 | Yeh | |

(Continued)

FOREIGN PATENT DOCUMENTS

WO   2014/157840   10/2014

OTHER PUBLICATIONS

Extended European Search Report issued in Appl. No. EP20181894.5 (dated 2020).

*Primary Examiner* — Edward Tso
(74) *Attorney, Agent, or Firm* — Barnes & Thornburg LLP (57) ABSTRACT

A wireless charging mount includes a wireless charger, an attachment portion, and a base portion. The wireless charger is coupled to the attachment portion, and the attachment portion is coupled to the base portion to support the wireless charger on the base portion. The base portion can attach with a movable or stationary object for supporting the mount thereon. The attachment portion supports a handheld electronic device on the mount, and the wireless charger selectively provides power to the handheld electronic device.

20 Claims, 6 Drawing Sheets

(56) References Cited

U.S. PATENT DOCUMENTS

| | | |
|---|---|---|
| 2013/0260677 A1 | 10/2013 | Partovi |
| 2013/0307470 A1 | 11/2013 | Wtanabe et al. |
| 2014/0042963 A1 | 2/2014 | Yu |
| 2014/0176062 A1 | 6/2014 | Jung |
| 2015/0002088 A1 | 1/2015 | D'Agostino |
| 2016/0190857 A1* | 6/2016 | Slater ................. H02J 50/80 320/108 |
| 2017/0110902 A1 | 4/2017 | Miller et al. |
| 2019/0082824 A1* | 3/2019 | Matlin ................. F16M 11/24 |

* cited by examiner

WIRELESS CHARGING MOUNT FOR HANDHELD ELECTRONIC DEVICES

BACKGROUND

The present disclosure relates to a mount, and particularly to a mount for handheld electronic devices. More particularly, the present disclosure relates to a wireless charging mount for handheld electronic devices.

SUMMARY

A wireless charging mount in accordance with the present disclosure includes a wireless charger, an attachment portion, and a base portion. The wireless charger is coupled to the attachment portion, and the attachment portion is coupled to the base portion to support the wireless charger on the base portion. The base portion can attach with a movable or stationary object for supporting the mount thereon. The attachment portion supports a handheld electronic device on the mount, and the wireless charger selectively provides power to the handheld electronic device.

In illustrative embodiments, the attachment portion includes a head and a post. The head is coupled to the post, and the post is coupled to the base portion. The head engages with a receptacle on the handheld electronic device for attachment of the handheld electronic device with the mount.

In illustrative embodiments, the wireless charger is movable along the attachment portion between a raised position adjacent to the head and spaced apart from the base portion and a lowered position adjacent to the base portion and spaced apart from the head. The lowered position allows connection of the head with the receptacle. The wireless charger engages with the receptacle in the raised position to block rotation of the receptacle relative to the attachment portion at the selection of a user.

In illustrative embodiments, the post extends through the wireless charger to engage with the head. A fastener extends into the head and through the post to engage with the base portion to hold the attachment portion on the base portion. A biasing member is positioned between the post and the wireless charger to bias the wireless charger toward the raised position. The head is blocked against rotation relative to the post. The wireless charger is blocked against rotation relative to the post.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures, and like reference characters designate the same or similar parts throughout the figures, of which.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

Figure 1:
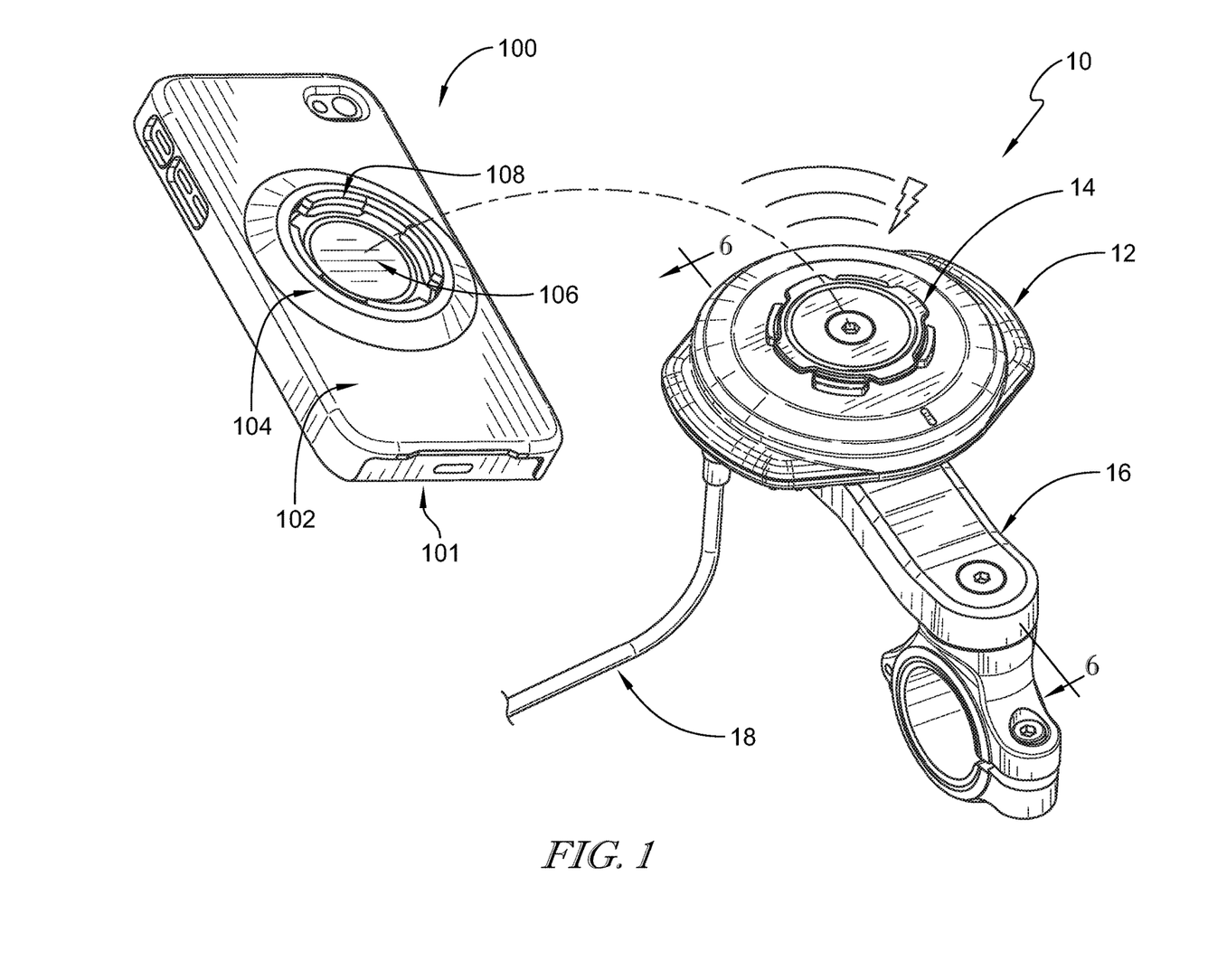
FIG. 1 is a perspective view of a wireless charging mount in accordance with the present disclosure showing that the wireless charging mount includes a wireless charger, an attachment portion, and a base portion and suggesting that a handheld electronic device attaches with the mount to support the handheld electronic device.

A wireless charging mount 10 in accordance with the present disclosure is shown in FIG. 1. The mount 10 is configured for attachment with a vehicle, such as a motorcycle, and to engage with a case 100 for positioning a handheld electronic device 101, such as a smartphone, tablet, GPS unit, or monitor, relative to the vehicle. The mount 10 includes a wireless charger 12, an attachment portion 14, and a base portion 16. A cable 18 provides power to the wireless charger 12. The wireless charger 12 is coupled to the attachment portion 14, and the attachment portion 14 is coupled to the base portion 16 to support the wireless charger 12 on the base portion 16. The base portion 16 is configured for attachment to a vehicle, such as the handle bars of a motor cycle or bicycle. The attachment portion 14 can be coupled with other base portions for a variety of connections to movable and stationary objects without departing from the present disclosure. In some embodiments, no base portion is used and the attachment portion 14 engages with an object for supporting the case 100 and handheld electronic device 101 on the object. The wireless charger 12 moves relative to the attachment portion 14 to allow attachment of the case 100 to the mount 10, and engages with the case 100 to block removal of the case 100 from the mount 10 at the selection of a user.

In the illustrative embodiment, the attachment portion 14 is configured to engage with the case 100 coupled to the handheld electronic device 101 for supporting the handheld electronic device 101 on the mount 10 as shown in FIG. 1. The case 100 includes a frame 102 coupled to the handheld electronic device 101 and a receptacle 104 coupled to the frame 102. The receptacle 104 includes a cavity 106 formed into the frame 102 and a plurality of arcuate projections 108 extending inward from a perimeter of the cavity 106. Four projections 108 are illustratively shown, but more or less projections can be used without departing from the present disclosure. The attachment portion 14 of the mount 10 extends into the cavity 106 of the case 100 and engages with the projections 108 to hold the case 100 and attached handheld electronic device 101 on the mount 10. A similar mounting arrangement is disclosed in U.S. Pat. No. 9,243,739, issued Jan. 26, 2016, the entire disclosure of which is incorporated by reference herein. In some embodiments, the receptacle 104 can be used without the frame 102 and attached to the handheld electronic device 101 with an adhesive, for example or other attachment means. In some embodiments the case 100 and/or receptacle 104 are part of a mounting system with mount 10.

Figure 2:
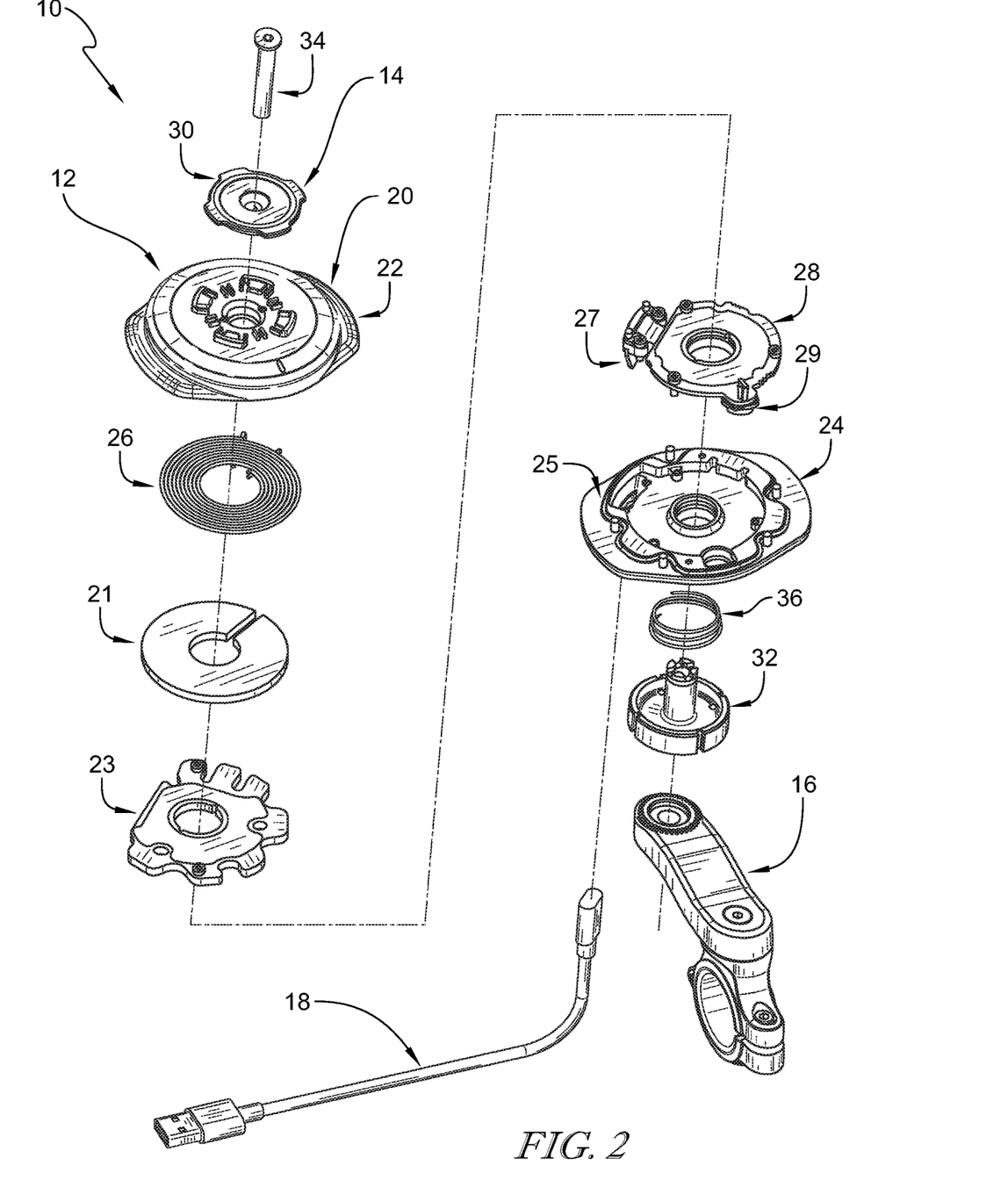
FIG. 2 is a perspective exploded assembly view of the wireless charging mount of FIG. 1.
Figure 5:
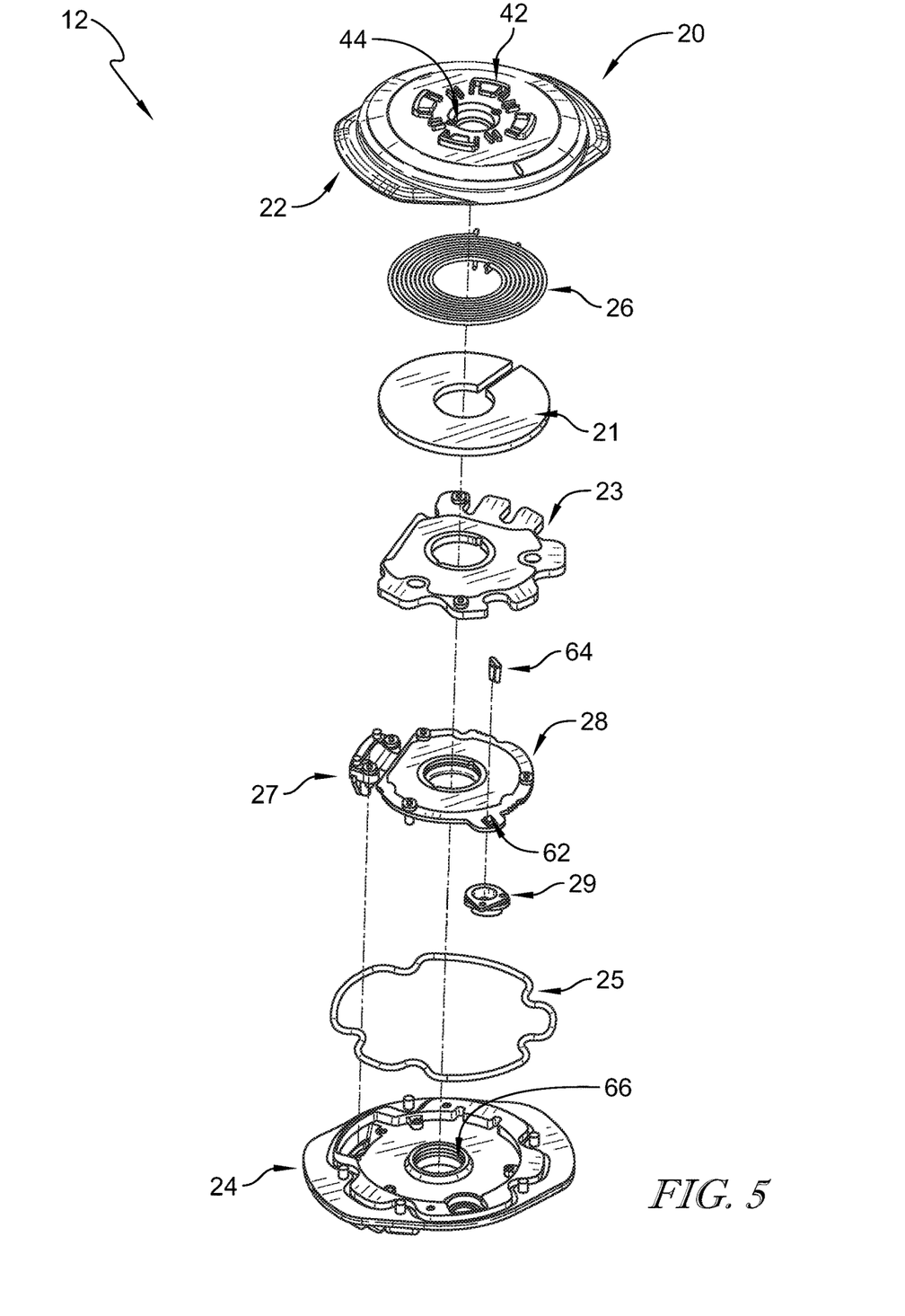
FIG. 5 is a perspective exploded assembly view of the wireless charger of FIG. 1.

The wireless charger 12 includes a housing 20, a transmission coil 26, and a control circuit 28 as shown in FIGS. 2 and 5. In the illustrative embodiment, the housing 20 includes an upper shell 22 and a lower shell 24. The transmission coil 26 and control circuit 28 are arranged inside the housing 20 between the upper and lower shells 22, 24. A plug 27 is coupled to the control circuit 28 for connection of the cable 18. A switch 29, such as a push button, allows a user to activate the wireless charger 12. In some embodiments, an indicator 62, such as an LED, and a lens 64 provide a signal to a user when the wireless charger 12 is activated, among other possible signals contemplated by the present disclosure. The cable 18 delivers power from a power source, such as a battery of a vehicle, to the control circuit 28 through the plug 27.

Figure 8:
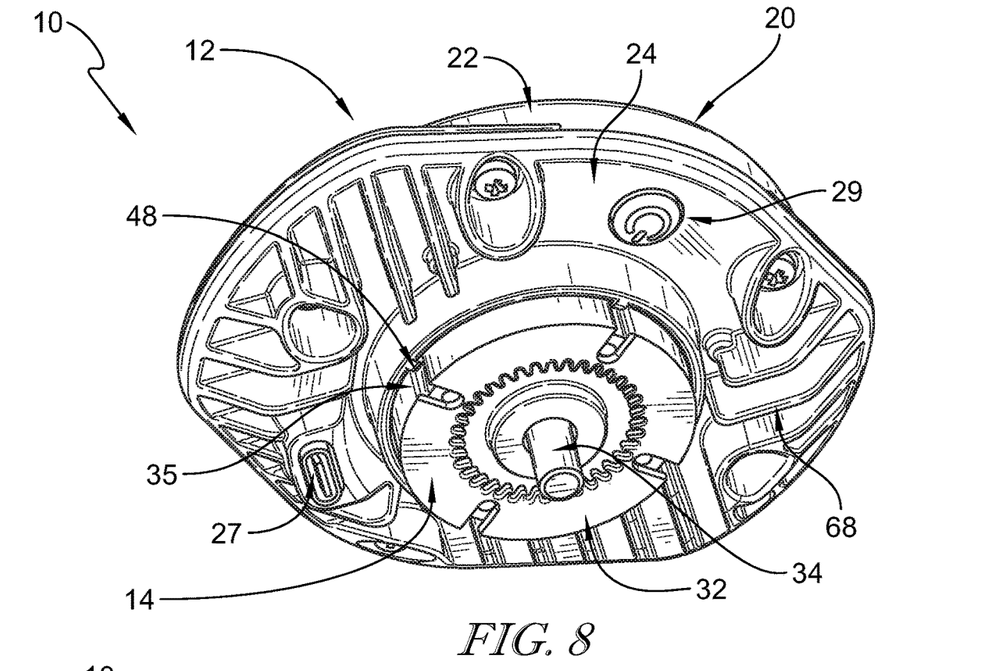
FIG. 8 is a lower perspective view of the wireless charger of FIG. 1.
Figure 9:
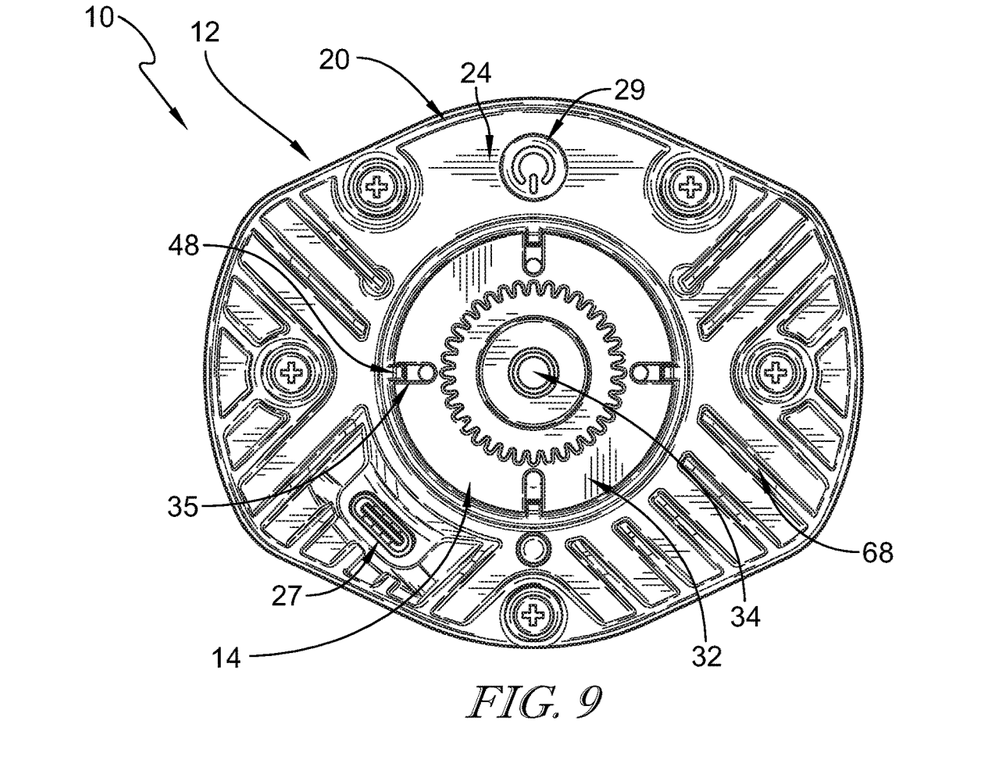
FIG. 9 is a lower plan view of the wireless charger of FIG. 8.

The control circuit 28 selectively delivers power to the transmission coil 26 for wireless charging of the handheld electronic device 101 coupled to the mount 10 as suggested in FIG. 1. For example, the control circuit 28 can be configured to produce electromagnetic radiation through the transmission coil 26 for inducing a responsive current to be formed in a receiver coil in the handheld electronic device 101. In some embodiments, the wireless charger 12 includes a spacer 21 and a plate 23 as shown in FIGS. 2 and 5. The control circuit 28 is positioned between the plate 23 and the lower shell 24, and the spacer 21 is positioned between the transmission coil 26 and the plate 23. Gaskets 25, 66 are configured to provide a seal between the upper and lower shells 22, 24 around the control circuit 28 as shown in FIG. 5. Gaskets or other sealing elements can also be provided around the plug 27 and switch 29 for sealing the housing 20 against water, debris, or other contaminants that the wireless charger 12 may be exposed to during use. In some embodiments, the lower shell 24 can be formed from a heat conductive material, such as metal, and formed to define a heat transfer structure 68, such as a plurality of fins, to allow dissipation of heat produced by the wireless charger 12 during operation as shown in FIGS. 8 and 9.

Figure 3:
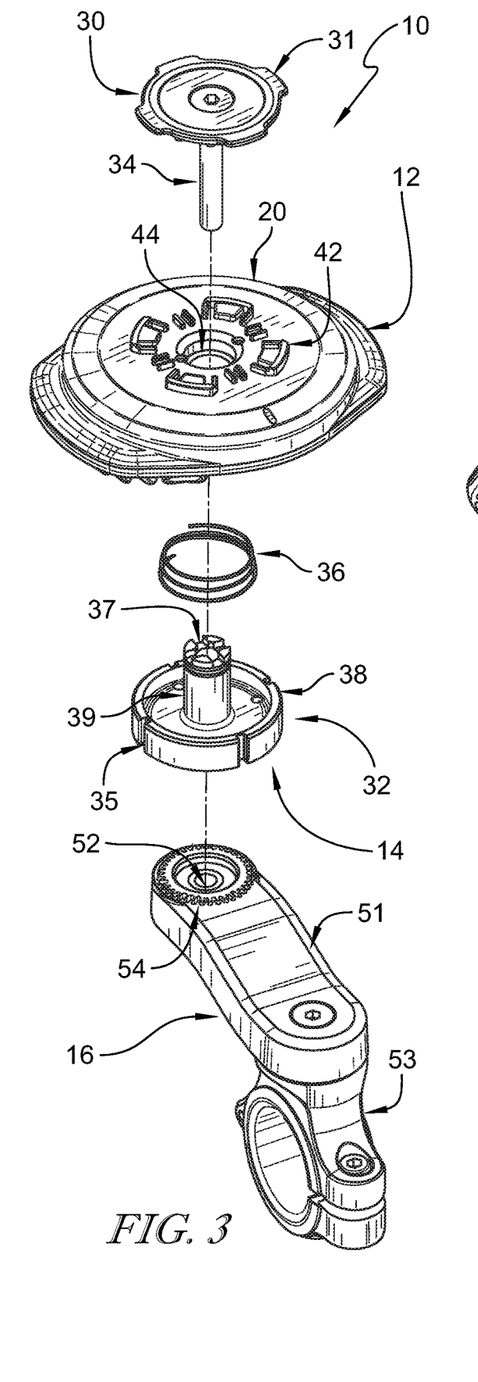
FIG. 3 is an upper perspective exploded assembly view of the wireless charging mount of FIG. 1.
Figure 4:
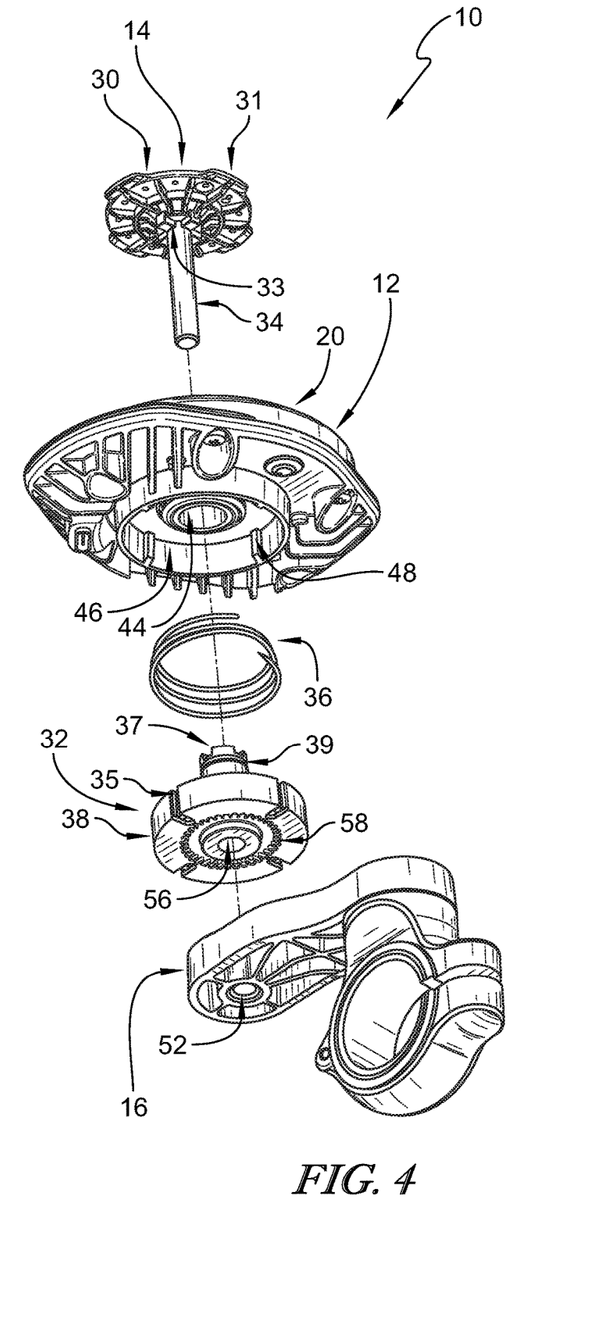
FIG. 4 is a lower perspective exploded assembly view of the wireless charging mount of FIG. 3.

The attachment portion 14 includes a head 30 and a post 32 as shown in FIGS. 2-4. In the illustrative embodiment, a fastener 34, such as a bolt, extends into the head 30 and through the post 32 to engage with the base portion 16 and hold the attachment portion 14 on the base portion 16. The head 30 includes a plurality of tabs 31 extending outward from a perimeter of the head 30 and one or more detents 33 extending toward the post 32 as shown in FIGS. 3 and 4. One or more lugs 42 extend from the housing 20, such as from the upper shell 22, toward the head 30 and are circumferentially offset from the tabs 31. The post 32 includes a foot 38 and a shaft 39 extending from the foot 38 toward the head 30. One or more keyways 35 are formed into the foot 38, and one or more notches 37 are formed into the shaft 39. The shaft 39 extends through an opening 44 of the wireless charger 12 to engage with the head 30, and the detents 33 engage with the notches 37 to block rotation of the head 30 relative to the post 32 when assembled. In the illustrative embodiment, the transmission coil 26 extends around the opening 44 such that the shaft 39 extends through the transmission coil 26 as suggested in FIG. 2. The control circuit 28 can also extend around the opening 44 such that the shaft 39 extends through the control circuit 28. A recess 46 is formed into the housing 20, such as into the lower shell 24, and arranged to receive the foot 38 of the post 32 as shown in FIG. 4. One or more keys 48 extend into the recess 46 and engage with the keyways 35 to block rotation of the housing 20 relative to the post 32 when assembled. A biasing member 36, such as a coil spring, is arranged in the recess 46 between the housing 20 and the post 32.

The fastener 34 engages with the head 30 to block the fastener 34 from passing through the head 30 as shown in FIGS. 3 and 4. The base portion 16 illustratively includes an arm 51 and a clamp 53. The arm 51 is coupled to the clamp 53 for attachment with the handlebars of a vehicle, for example. A complementary fastener 52, such as a nut, is coupled to the arm 51 and configured to engage with the fastener 34 for holding the attachment portion 14 on the base portion 16. The fastener 34 extends through a bore 56 of the post 32 to engage with the fastener 52. Mating sets of teeth 54, 58 on the arm 51 and post 32, respectively, block rotation of the attachment portion 14 relative to the base portion 16 when assembled. The teeth 54, 58 allow adjustment of a rotational position of the attachment portion 14, around fastener 34, relative to the base portion 16. A similar arrangement is shown in U.S. Pat. App. Pub. No. 2019/0009850, published Jan. 10, 2019, the entire disclosure of which is incorporated by reference herein.

Figure 6:
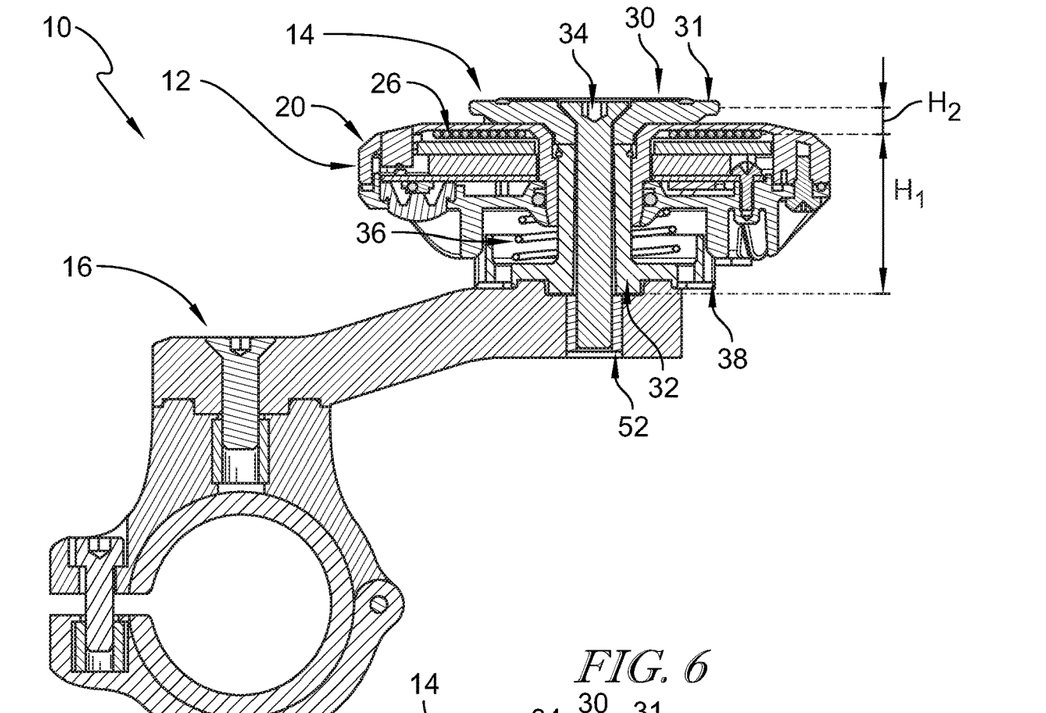
FIG. 6 is a sectional view taken along line 6-6 in FIG. 1 showing the wireless charger in a raised position.
Figure 7:
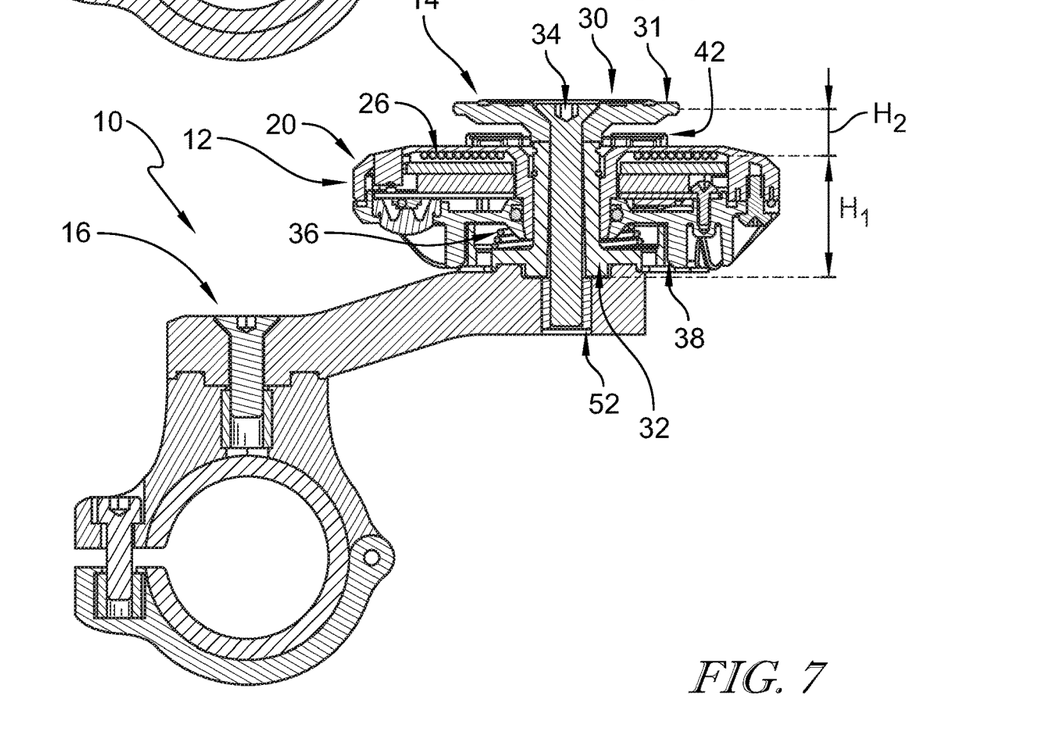
FIG. 7 is a view similar to FIG. 6 showing the wireless charger in a lowered position.

The wireless charger 12 is movable relative to the attachment portion 14 (e.g., along the attachment portion 14 in a direction substantially parallel to the fastener 34) between a raised position, shown in FIG. 6, and a lowered position, shown in FIG. 7. The biasing member 36 biases the wireless charger 12 toward the raised position. In the illustrative embodiment, the housing 20 is adjacent to the head 30 and spaced apart from the base portion 16 in the raised position. The housing 20 is adjacent to the base portion 16 and spaced apart from the head 30 in the lowered position. The transmission coil 26 is positioned at a first height $H_1$ relative to a lower end of the post 32 and second height $H_2$ relative to the tabs 31 of the head 30 in the raised position. In the lowered position, the first height $H_1$ is decreased and the second height $H_2$ is increased compared to the raised position. In some embodiments, the wireless charger 12 engages with the head 30 in the raised position blocking removal of the wireless charger 12 from the attachment portion 14. In some embodiments, an underside of the wireless charger 12 engages with the foot 38 of the post 32 in the lowered position to limit movement of the wireless charger 12 away from the head 30.

During attachment of the case 100 to the mount 10, a user arranges the receptacle 104 relative to the head 30 of the attachment portion 14 as suggested in FIG. 1. The user aligns the projections 108 engage with the lugs 42 and moves the wireless charger 12 toward the lowered position (e.g., away from the head 30 and toward the base portion 16) against the bias of the biasing member 36. The user rotates the case 100 to align the projections 108 with the tabs 31 of the head 30, and the biasing member 36 moves the wireless charger 12 to the raised position (e.g., toward the head 30 and away from the base portion 16). The lugs 42 extend between the projections 108 to block rotation of the case 100 relative to the attachment portion 14, and the projections 108 engage with the tabs 31 to block removal of the case 100 from the attachment portion 14 at the selection of a user. To remove the case 100, the user moves the wireless charger 12 toward the lowered position to remove the lugs 42 from between the projections 108, and the case 100 is rotated so that the projections 108 are circumferentially offset from the tabs 31 allowing the user to pass the tabs 31 between the projections 108.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation to encompass all such modifications and equivalent structures and functions.

The invention claimed is:

1. A wireless charging mount comprising:
a base portion;
an attachment portion including a post coupled to the base portion and a head coupled to the post, the head configured to engage with a receptacle on a handheld electronic device to support the handheld electronic device on the base portion; and
a wireless charger coupled to the attachment portion to support the wireless charger on the base portion, the wireless charger configured to selectively provide power to the handheld electronic device;
wherein the wireless charger is movable along the attachment portion between a raised position adjacent to the head and spaced apart from the base portion and a lowered position adjacent to the base portion and spaced apart from the head;
wherein the lowered position allows connection of the head with the receptacle, and wherein the wireless charger is configured to engage with the receptacle in the raised position to block rotation of the receptacle relative to the attachment portion at the selection of a user.

2. The wireless charging mount of claim 1, further comprising a biasing member engaged between the post and the wireless charger and configured to bias the wireless charger toward the raised position.

3. The wireless charging mount of claim 1, wherein a tab extends outward from a perimeter of the head, wherein a lug extends from the wireless charger toward the head and is circumferentially offset from the tab, and wherein the lug is configured to engage with the receptacle to block rotation of the receptacle relative to the attachment portion and the tab is configured to engage with the receptacle to block removal of the receptacle from the attachment portion with the wireless charger in the raised position.

4. The wireless charging mount of claim 1 wherein the head is blocked against rotation relative to the post, and wherein the wireless charger is blocked against rotation relative to the post.

5. A wireless charging mount comprising:
a base portion;
an attachment portion including a post coupled to the base portion and a head coupled to the post, the head configured to engage with a receptacle on a handheld electronic device to support the handheld electronic device on the base portion; and
a wireless charger coupled to the attachment portion to support the wireless charger on the base portion, the wireless charger configured to selectively provide power to the handheld electronic device;
wherein the wireless charger is movable along the attachment portion between a raised position adjacent to the head and spaced apart from the base portion and a lowered position adjacent to the base portion and spaced apart from the head;
further comprising a fastener extending into the head and through the post to engage with the base portion and hold the attachment portion on the base portion.

6. The wireless charging mount of claim 5, wherein the wireless charger moves between the raised and lowered positions substantially parallel to the fastener.

7. A wireless charging mount comprising:
a base portion;
an attachment portion including a post coupled to the base portion and a head coupled to the post, the head configured to engage with a receptacle on a handheld electronic device to support the handheld electronic device on the base portion; and
a wireless charger coupled to the attachment portion to support the wireless charger on the base portion, the wireless charger configured to selectively provide power to the handheld electronic device,
wherein the wireless charger is movable along the attachment portion between a raised position adjacent to the head and spaced apart from the base portion and a lowered position adjacent to the base portion and spaced apart from the head,
wherein the post includes a foot and a shaft extending from the foot toward the head.

8. The wireless charging mount of claim 7, wherein the shaft extends through the wireless charger to engage with the head.

9. The wireless charging mount of claim 8, wherein the wireless charger includes a housing, a transmission coil, and a control circuit, wherein the transmission coil and control circuit are positioned in the housing, and wherein the transmission coil extends around the shaft.

10. A mounting system comprising:
a receptacle configured to couple with a handheld wireless device; and
a wireless charging mount comprising:
an attachment portion including a post and a head coupled to the post, the head configured to engage with the receptacle to support the handheld electronic device; and
a wireless charger coupled to the attachment portion, the wireless charger configured to selectively provide power to the handheld electronic device;
wherein the wireless charger is movable along the attachment portion between a raised position adjacent to the head and a lowered position spaced apart from the head;
wherein the lowered position allows connection of the head with the receptacle, and wherein the wireless charger is configured to engage with the receptacle in the raised position to block rotation of the receptacle relative to the attachment portion at the selection of a user.

11. The mounting system of claim 10, further comprising a biasing member engaged between the post and the wireless charger and configured to bias the wireless charger toward the raised position.

12. The mounting system of claim 10, wherein a tab extends outward from a perimeter of the head, wherein a lug extends from the wireless charger toward the head and is circumferentially offset from the tab, and wherein the lug is configured to engage with the receptacle to block rotation of the receptacle relative to the attachment portion and the tab is configured to engage with the receptacle to block removal of the receptacle from the attachment portion with the wireless charger in the raised position.

13. The mounting system of claim 10, wherein the head is blocked against rotation relative to the post, and wherein the wireless charger is blocked against rotation relative to the post.

14. A mounting system comprising:
   a receptacle configured to couple with a handheld wireless device; and
   a wireless charging mount comprising:
      an attachment portion including a post and a head coupled to the post, the head configured to engage with the receptacle to support the handheld electronic device; and
      a wireless charger coupled to the attachment portion, the wireless charger configured to selectively provide power to the handheld electronic device;
      wherein the wireless charger is movable along the attachment portion between a raised position adjacent to the head and a lowered position spaced apart from the head;
   further comprising a fastener extending into the head and through the post.

15. The mounting system of claim 14, wherein the wireless charger moves between the raised and lowered positions substantially parallel to the fastener.

16. A mounting system comprising:
   a receptacle configured to couple with a handheld wireless device; and
   a wireless charging mount comprising:
      an attachment portion including a post and a head coupled to the post, the head configured to engage with the receptacle to support the handheld electronic device; and
      a wireless charger coupled to the attachment portion, the wireless charger configured to selectively provide power to the handheld electronic device;
      wherein the wireless charger is movable along the attachment portion between a raised position adjacent to the head and a lowered position spaced apart from the head;
   wherein the post includes a foot and a shaft extending from the foot toward the head.

17. The mounting system of claim 16, wherein the shaft extends through the wireless charger to engage with the head.

18. The mounting system of claim 17, wherein the wireless charger includes a housing, a transmission coil, and a control circuit, wherein the transmission coil and control circuit are positioned in the housing, and wherein the transmission coil extends around the shaft.

19. A wireless charging mount comprising:
   an attachment portion including a post and a head coupled to the post, the head configured to engage with a receptacle on a handheld electronic device to support the handheld electronic device, the post including a foot and a shaft extending from the foot toward the head; and
   a wireless charger coupled to the attachment portion, the wireless charger configured to selectively provide power to the handheld electronic device,
   wherein the wireless charger is movable along the attachment portion between a raised position adjacent to the head and a lowered position spaced apart from the head, the lowered position allows connection of the head with the receptacle, the wireless charger is configured to engage with the receptacle in the raised position to block rotation of the receptacle relative to the attachment portion at the selection of a user, and the shaft extends through the wireless charger to engage with the head.

20. The wireless charging mount of claim 19, wherein the wireless charger includes a housing, a transmission coil, and a control circuit, wherein the transmission coil and control circuit are positioned in the housing, and wherein the transmission coil extends around the shaft.

* * * * *